United States Patent Office 2,781,265
Patented Feb. 12, 1957

2,781,265

PHOTOSENSITIVE MATERIAL

Frederick W. von Meister, Mendham, N. J., assignor to Keuffel & Esser Company, Hoboken, N. J., a corporation of New Jersey No Drawing. Application March 15, 1952,
Serial No. 276,870

14 Claims. (Cl. 96—75)

This invention relates to photosensitive materials of the type used for the reproduction of engineering drawings.

In particular it relates to diazotype reproduction materials. This type of light sensitive material is formed by coating a base material with a solution to form a light sensitive coating on the base. Paper is the usual base material although other base materials may be used such as cloth, tracing cloth, tracing paper and in template work, glass cloth and metal.

The principal objects of the invention are to provide photosensitive materials for the reproduction of engineering drawings and the like which produce prints characterized by increased contrast and improved uniformity of colored areas.

The improved results are obtained by means of a precoating applied to the base material. Conventional light sensitive formulations are then coated on the precoated base material. Precoating has already been used as a means of improving light sensitive materials which are useful in the engineering field. For example, precoating with colloidal silica has proven to give very desirable results on blueprint paper. However colloidal silica precoats have not worked satisfactorily on diazotype materials. Recently precoating with colloidal resin dispersions or emulsions in water and drying has been suggested for diazotype materials and in fact a process of precoating with colloidal polystyrene dispersions is being licensed to the industry. Colloidal polystyrene dispersions are commercially available for use in the licensed precoating process.

The licensed precoating process gives some improvement in contrast but the colored areas are not uniform unless the master is very opaque. However, it has now been found quite unexpectedly that if a metal salt such as zinc chloride is added to the commercially available polystyrene dispersion and the so treated material is used as a precoat for diazotype material, prints of greatly improved contrast are surprisingly obtained. Furthermore these prints do not show the fibrous structure of the base material, but the colored areas are uniformly dark even when the image areas of the master are somewhat translucent.

Microscopic examination of the commercially available polystyrene dispersion (sometimes called emulsion by the manufacturer) and of the dispersion after treatment with a metal salt reveals that the untreated dispersion has uniformly dispersed submicroscope particles (no structure is visible under a magnification of 100×) and that the treated dispersion shows flocculated particles. Any method which forms a flocculated suspension of the resin in the carrier liquid produces a satisfactory precoating material for obtaining the outstanding improvement of the present invention.

Many metal salts are suitable for producing the desired flocculation of the commercially available polystyrene dispersion. For example, barium chloride, calcium chloride, aluminum sulphate, magnesium sulphate, chromium sulphate, cobalt chloride, manganese sulphate and zinc chloride may be used. As is known in colloid chemistry, the electrolyte should preferably form a metal ion having a positive charge of at least two. Because of their deleterious effect on diazotype materials, the use of iron salts as an electrolyte for this purpose should be avoided.

It is preferred to use about 4 parts of a 6% solution of the metal salt to 100 parts of the diluted polystyrene emulsion containing about 1.5% solids. However, 4 parts of a solution containing as little as ¼% or as much as several percent of the metal salt will in most cases be effective for producing the desired flocculation. The dispersion should be thoroughly agitated while the metal salt is being added. If not agitated, the flocculated particles may settle to the bottom. In some cases such settled particles may appear to have a consistency of cottage cheese. The latter type of complete flocculation or coagulation is obviously not satisfactory for precoating. In order to distinguish from this type of complete flocculation, the term partially flocculated suspension will be used herein to designate the condition in which the resin should be coated on the base material.

Submicroscopic solid particles uniformly dispersed in a liquid forms what is correctly termed a colloidal dispersion. When liquid particles are so dispersed the correct term is an emulsion. A resin dissolved in an organic liquid and then dispersed in water might also be called an emulsion. It is also possible to form a resin dispersion by first forming an emulsion of the liquid monomer and then polymerizing it in the colloidally suspended state. However, the term colloidal dispersion as used herein is meant to cover the suspension of submicroscopic solid particles of a resin whether or not a solvent liquid is present and regardless of the method by which it is produced.

Commercially available colloidal dispersions of resins in water may also contain surface active agents or other substances which tend to stabilize the dispersion. The amount and type of electrolyte necessary to produce flocculation may depend on the extent to which the commercially available colloidal dispersion has been stabilized and the stabilizing agent which has been used. If the dispersion is too highly stabilized, it may not be possible to form a flocculation by adding a metal salt. On the other hand, if the dispersion is not sufficiently stabilized, addition of a metal salt may result in complete flocculation or coagulation of the dispersion to a mass of cheeselike consistency. In any event a person skilled in the art will have no difficulty in obtaining a suitable colloidal dispersion and treating it to form the desired partially flocculated suspension. In forming the partially flocculated suspension, it is preferable that the particles do not get too large since extremely large particles may be rubbed off by the scraping bar of the coating machine.

In some cases flocculation may be accelerated by heating the dispersion after the addition of the metal salts. However, heating alone does not appear to produce flocculation of the commercially available resin dispersions.

The pH of the precoating solution is not critical but since most of the metal salts have insoluble hydroxides, the pH is preferably kept on the acid side.

In practice, the commercial dispersion of the resin is diluted during constant agitation. Then the metal salt is added with continued agitation to form the partially flocculated suspension. The partially flocculated suspension is coated on the base material in the ordinary type of coating machine used in the art, in which the excess may be removed with a doctor blade. The precoated material is dried by heating at a temperature below the fusing temperature of the resin employed and then the photosensitive solution is coated on the resin coating in the usual manner. A person skilled in the art may readily obtain the desired coating viscosity for a given machine speed combined with the desired weight of coating per square foot by controlling the dilution and the amount of electrolyte added (i. e. the degree of flocculation).

The invention is applicable to moist or semi-wet developing diazotype materials as well as to dry-developing diazotopes. Polystyrene resins have proved particularly useful but other resins such as vinyl and acrylic resins as well as copolymers of these resins may also be used. It may also be desirable to add other substances to the precoating solution. For example, in some cases it is desirable to add finely divided silica either to the precoat or to the sensitizing solution. When considerable silica is added to the precoat, it is possible to reduce the amount of resin and still obtain the advantages of the present invention. It is also possible to split the silica between the precoating solution and the sensitizing solution.

The following examples are inserted in order to illustrate the present invention.

*Example I*

½ liter of the polystyrene dispersion sold by the H. P. Andrews Company of New York, N. Y., for use as a diazotype precoat containing about 40% solids in water is diluted with 9½ liters of water during constant agitation. 400 cc. of 6% zinc chloride dissolved in water is then added with continued agitation. A noticeable change in the suspension takes place. The flocculated suspension is then coated on paper in a conventional coating machine and passed over heating coils to dry it. The precoated paper is passed through another drying channel after having been coated with a photosensitive sensitizing solution containing:

100 cc. of water.
2.2 g. of p-diazo-N, N-diethyl-aniline-zinc chloride double salt.
1.5 g. of 7 hydroxy-1,2-naphthimidazole.
8.0 g. of citric acid.
5.0 g. of zinc chloride.
4.0 g. of thiourea.

Any other known diazotope sensitizing solution containing a light sensitive diazo compound and an azo dye coupling component or any moist developing sensitizing solution which does not require an azo coupling component may be used.

*Example II*

The same procedure as described in Example I is used except that only 150 cc. of the 6% zinc chloride solution are used to form the partially flocculated suspension.

*Example III*

The same procedure as described in Example I is used except that 400 cc. of a 6% barium chloride solution is used to form the partially flocculated suspension.

*Example IV*

The same procedure as described in Example I is used except that 400 cc. of a 6% aluminum sulphate solution are used to form the partially flocculated suspension.

*Example V*

A polystyrene resin dispersion of the type disclosed in Example I or of equivalent type is diluted to produce a dispersion containing 4% solids and partially flocculated by adding a small quantity of a solution of a metal salt as described in Example I. .1–3% of dry silica dispersed in a small quantity of water is then added to the polystyrene dispersion and thoroughly mixed therewith. It is preferable to use a silica product having at least some particles large enough to be seen under a microscope. When using more than 1% of silica it may be desirable to reduce the amount of polystyrene. The base material is precoated with this dispersion and then coated with the sensitizing solution disclosed in Example I.

Any other suitable sensitizing solution may be used.

*Example VI*

The procedure described in Example I is followed except that 1% of dispersed silica is added to the photosensitive sensitizing solution.

The proportion of silica added to the sensitizing solution may be varied from .5 to 5.0% depending on the exact results sought.

Having thus described the invention, what is claimed is:

1. The method of producing photosensitive materials comprising the steps of treating a colloidal dispersion of polystyrene resin in an aqueous liquid with a flocculating agent to partially flocculate substantially all the particles to a size visible under 100× magnification, precoating a base material with said suspension of a polystyrene resin in an aqueous liquid to deposit a coating of said styrene resin on said base material and then applying an aqueous solution containing a light sensitive diazo compound to deposit a coating containing said light sensitive diazo compound over said resin coating.

2. The method of producing photosensitive materials comprising the steps of adding a metal salt to a colloidal dispersion of a polystyrene resin in water to form a partially flocculated suspension of said polystyrene resin in water, precoating a base material with said partially flocculated suspension of said polystyrene resin in water to deposit a coating of said polystyrene resin on said base material and then applying an aqueous solution containing a light sensitive diazo compound to deposit a coating containing said light sensitive diazo compound over said polystyrene resin coating.

3. The method of producing photosensitive materials comprising the steps of treating a colloidal dispersion of polystyrene resin in an aqueous liquid with a flocculating agent to partially flocculate substantially all the particles to a size visible under 100× magnification, precoating a paper base with said suspension of polystyrene resin in an aqueous liquid to deposit a coating of said resin on said paper base and then applying an aqueous solution containing a light sensitive diazo compound to deposit a coating containing said light sensitive diazo compound over said resin coating.

4. The method of producing photosensitive diazotype materials comprising the steps of adding a polyvalent metal salt to a colloidal dispersion of a polystyrene resin in water to form a partially flocculated suspension of said polystyrene resin in water, precoating a paper base with said partially flocculated suspension of said polystyrene resin in water to deposit a coating of said polystyrene resin on said paper base and then applying an aqueous solution containing a light sensitive diazo compound to deposit a photosensitive diazotype coating over said resin coating.

5. The method of producing photosensitive materials comprising the steps of treating a colloidal dispersion of polystyrene resin in an aqueous liquid with a flocculating agent to partially flocculate substantially all the particles to a size visible under 100× magnification, precoating a base material with said suspension of polystyrene resin in an aqueous liquid to deposit a coating of said resin on said base material and then applying an aqueous solution containing a photosensitive diazotype material over said resin coating, at least one of said coatings also containing silica.

6. The method of producing photosensitive materials comprising the steps of treating a colloidal dispersion of polystyrene resin in an aqueous liquid with a flocculating agent to partially flocculate substantially all the particles to a size visible under 100× magnification, precoating a base material with said suspension of polystyrene resin in an aqueous liquid also containing silica to deposit a coating of said resin and silica on said base material and then applying an aqueous solution containing a photosensitive diazotype material over said resin coating.

7. The method of producing photosensitive materials comprising the steps of treating a colloidal dispersion of polystyrene resin in an aqueous liquid with a flocculating agent to partially flocculate substantially all the particles to a size visible under 100× magnification, precoating a base material with said suspension of polystyrene resin in an aqueous liquid to deposit a coating of said resin on said base material and then applying an aqueous solution containing a photosensitive diazotype material and silica over said resin coating.

8. The product produced by the method of claim 1.
9. The product produced by the method of claim 2.
10. The product produced by the method of claim 3.
11. The product produced by the method of claim 4.
12. The product produced by the method of claim 5.
13. The product produced by the method of claim 6.
14. The product produced by the method of claim 7.

References Cited in the file of this patent

UNITED STATES PATENTS

| | | |
|---|---|---|
| 1,980,589 | Acree | Nov. 13, 1934 |
| 2,207,695 | Cummings | July 9, 1940 |
| 2,327,380 | Toland et al. | Aug. 24, 1943 |
| 2,340,358 | Young | Feb. 1, 1944 |
| 2,384,632 | MacKenzie et al. | Sept. 11, 1945 |
| 2,433,515 | Jahoda | Dec. 30, 1947 |
| 2,544,237 | Reese | Mar. 6, 1951 |
| 2,551,133 | Jennings et al. | May 1, 1951 |
| 2,593,911 | Neumann et al. | Apr. 22, 1952 |
| 2,597,872 | Iler | May 27, 1952 |

FOREIGN PATENTS

| | | |
|---|---|---|
| 645,954 | Great Britain | Nov. 15, 1950 |